US008925197B2

(12) United States Patent
Royal et al.

(10) Patent No.: US 8,925,197 B2
(45) Date of Patent: Jan. 6, 2015

(54) COMPRESSOR THRUST BEARING SURGE PROTECTION

(75) Inventors: John H. Royal, Grand Island, NY (US); Michael J. Stanko, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 120 days.

(21) Appl. No.: 13/482,307

(22) Filed: May 29, 2012

(65) Prior Publication Data

US 2013/0318797 A1    Dec. 5, 2013

(51) Int. Cl.
  *B23P 15/00*    (2006.01)
  *F01D 3/00*    (2006.01)

(52) U.S. Cl.
  USPC ..................... 29/888.024; 415/104

(58) Field of Classification Search
  CPC . F04D 29/2266; F04D 27/0269; F04D 17/08; F04D 17/10; F04D 17/12; F04D 17/122; F04D 27/009; F04D 27/0207; F04D 29/041
  USPC ............. 29/898.09, 898.041, 889.4, 888.024, 29/888.02; 415/106
  See application file for complete search history.

(56) References Cited

U.S. PATENT DOCUMENTS

| | | |
|---|---|---|
| 3,895,689 A | 7/1975 | Swearingen |
| 4,287,758 A | 9/1981 | Swearingen |
| 4,385,768 A | 5/1983 | Swearingen |
| 4,472,107 A * | 9/1984 | Chang et al. ................. 415/104 |
| 4,523,896 A | 6/1985 | Lhenry et al. |
| 5,248,239 A | 9/1993 | Andrews |
| 5,743,715 A | 4/1998 | Staroselsky et al. |
| 5,795,138 A | 8/1998 | Gozdawa |
| 5,857,348 A | 1/1999 | Conry |
| 5,980,218 A | 11/1999 | Takahashi et al. |
| 6,310,414 B1 | 10/2001 | Agahi et al. |
| 6,398,517 B1 | 6/2002 | Choi |
| 6,471,493 B2 | 10/2002 | Choi et al. |
| 6,579,078 B2 | 6/2003 | Hill et al. |
| 6,616,421 B2 | 9/2003 | Mruk et al. |
| 6,698,929 B2 | 3/2004 | Choi et al. |
| 6,910,483 B2 | 6/2005 | Daly et al. |

FOREIGN PATENT DOCUMENTS

| | | |
|---|---|---|
| EP | 0 102 334 A1 | 3/1984 |
| WO | WO 91/14853 | 10/1991 |
| WO | WO 95/35447 | 12/1995 |
| WO | WO 2011/078680 A1 | 6/2011 |

* cited by examiner

*Primary Examiner* — Alexander P Taousakis
*Assistant Examiner* — Matthew P Travers
(74) *Attorney, Agent, or Firm* — Robert J. Hampsch (57) ABSTRACT

The present invention provides a method and apparatus of inhibiting a thrust bearing capacity of a compression system from being exceeded during a surge event in which a thrust bearing is biased with a biasing force to increase the thrust bearing overload margin between the capacity of thrust bearing to absorb axial forces and the greatest force produced during the surge event. This biasing force can be produced by appropriately sizing the high pressure seal on the side of the impeller opposite to the inlet of a compressor of the compression system so that the back disk force produced in the high pressure region of the high pressure seal and the low pressure region located inwardly of the high pressure region creates the desired bias force value and direction.

8 Claims, 4 Drawing Sheets

COMPRESSOR THRUST BEARING SURGE PROTECTION

FIELD OF THE INVENTION

The present invention relates to a surge protection method and apparatus in which the capacity of a thrust bearing of a compressor is prevented from being exceeded during a surge event. More particularly, the present invention relates to such a method and apparatus in which a biasing force is exerted on an impeller of a compressor and through the compressor shaft to the thrust bearing, during normal operation of the compressor, by producing a force difference between an impeller eye side force and a back disk force exerted on the impeller through the back disk seal that increases the overload margin between the thrust bearing capacity and a surge force occurring during the surge event.

BACKGROUND OF THE INVENTION

Centrifugal compressors are well known in the art and are used in many applications to compress a gas from a lower pressure to a higher pressure. The gas at the lower pressure enters an inlet of the centrifugal compressor and is compressed to a higher pressure by being accelerated by a rotating impeller and then sent into a diffuser surrounding the impeller, in which additional pressure is recovered by decelerating the gas. The gas is discharged from the diffuser to a volute and from the volute to an outlet thereof at the higher pressure.

In a centrifugal compressor, a high pressure seal is provided on the back of the impeller or in other words on the side of the impeller opposite to the inlet. This seal is typically a labyrinth type of seal that has a smaller diameter than the outer diameter of the impeller as defined by the outer rim thereof. High pressure gas seeps through the outer rim during operation of the compressor and such seal prevents this high pressure gas from pressurizing the entire back of the impeller. A lower pressure gas from a location such as the compressor inlet or an even lower pressure source if available, is introduced into a cavity formed at the back of the compressor, between the motor shaft driving the impeller and the high pressure seal. Leakage from the cavity is prevented by a shaft seal on the motor shaft driving the impeller. The pressure within this cavity acts on the resulting inner annular area behind the impeller along with the high pressure acting in the outer annular area between the outer rim of the impeller and the high pressure seal. The sum of these two forces produce a force that is known as the back disk force on the impeller. Acting inwardly of the impeller, is an eye side force produced by the onrush of gas entering the impeller and acting on the surface of the impeller facing to the inlet. In the prior art, the high pressure seal is sized so that during design conditions the eye side force is in balance with the back disk force.

Compressors are designed to operate within an operating envelope that can be plotted in what is referred to as a compressor map of pressure ratio between outlet pressure and inlet pressure versus flow rate through the compressor. On such a plot, a peak or best efficiency operating line is plotted in which for a given flow rate and pressure ratio, the energy consumption of the compressor is at a minimum. The plot also has another dimension of specific speeds which cross the peak efficiency operating line. If the pressure ratio falls within the compressor for a given speed, a point is ultimately reached when the compressor goes into what is referred to as surge. A surge event is therefore, produced by flow rate through the compressor falling below a minimum flow required at a given speed of the impeller of the compressor that is necessary to maintain stable operation. From a viewpoint taken from the impeller, a surge event has two phases. In a first phase there is a sudden loss of discharge pressure within the impeller flow passages arising from aerodynamic instability in the impeller. This results in a decrease in the eye side pressure. However, the back disk force, remains high due to fluidic system inertial effects. This results in a large axial force on the impeller driving the impeller towards the inlet. The second phase of the surge event is produced by the high pressure back disk pressure bleeding down to lower eye side pressure, resulting in the eye side force overcoming the weakened back disk force. This produces a large axial force driving the impeller away from the inlet. The frequency at which these forces are developed is quite high resulting in destruction of the compressor starting with an overload of the thrust bearing.

The forces developed during a surge event can be computed or measured and the thrust bearings in the compressor can be designed with an overload margin to absorb these forces and prevent damage to the compressor. However, there has been the increasing use of what are referred to as oil-free bearings in centrifugal compressors. These oil free bearings are either electromagnetic bearings or aerodynamic bearings. In electromagnetic bearings, the motor shaft is suspended in both radial and axial directions by means of a magnetic force. However, such oil-free bearings when applied to the thrust bearing are less able to adsorb the large axial forces that occur during a surge event than conventional bearings that are lubricated with oil. Thus, the overload margins that can be provided by oil-free bearings are less than those that can be provided by conventional bearings. As such, during a surge event, the thrust bearing will be unable to absorb the forces and back-up-, bearings or bushings will be contacted to adsorb the force. The problem with this is that back-up bearings or bushings can only be subjected to a predefined small number of usages during these surge events. After this predetermined number, the compressor will have to be taken off-line for maintenance to replace the back-up bearings or bushings.

The problems outlined above with respect to oil-free bearings have therefore, limited their use in large compressor applications such as air separation plants in which such bearings would otherwise have the advantage of not contaminating the feed to the plant with oil, having much lower frictional losses, and will require less maintenance than conventional oil lubricated bearings. In an application such as an air separation plant, if a compressor is taken off-line, the plant will not function. Unplanned outages in any large installation will in any case result in financial hardship to the plant operator.

As will be discussed, unlike the prior art, the present invention provides a method and apparatus in which the impeller is preloaded with a biasing force that is larger than that required to simply balance impeller eye side and back disk forces during normal operation of the compressor. This preload force is used to increase an overload margin of the bearings that could be exceeded during a surge event and thus, is particularly applicable to a centrifugal compressor using oil-free bearings.

SUMMARY OF THE INVENTION

The present invention provides a method of inhibiting a thrust bearing capacity of a compression system from being exceeded during a surge event. In accordance with such method, the thrust bearing is biased with a biasing force acting in one of two opposite axial directions of a compressor shaft. In such a compressor, the compressor shaft is connected to the thrust bearing and to an impeller of at least one compressor that is in turn provided with a back disk seal. The compression shaft is driven by a driver to drive the impeller through rotation of the compressor shaft and the compression system has at least one stage of compression provided by the at least one compressor. The thrust bearing has a first thrust bearing capacity and a second trust bearing capacity to absorb axial loads acting upon the thrust bearing in the two opposite axial directions of the compressor shaft, respectively. Such thrust bearing is configured such that a first overload margin exists between the first thrust bearing capacity and a first surge force and a second overload margin exists between the second thrust bearing capacity and a second surge force. The first surge force and the second surge force act in the two opposite axial directions and are created during the surge event. The biasing force is exerted on the impeller and through the compressor shaft to the thrust bearing, during normal operation of the compression system, by producing a force difference between an impeller eye side force and a back disk force exerted on the impeller opposite to the eye side force. The back disk force is exerted by a high pressure outer annular region and a low pressure inner annular region of the impeller that is separated by the back disk seal. The biasing force increases one of the first overload margin and the second overload margin such that the first overload margin and the second overload margin are no less than about twenty-five percent of the first through bearing capacity and the second thrust bearing capacity, respectively.

Although the increase of one of the overload margins will be at the expense of the other of the overload margins of the thrust bearing, the largest surge force can thereby be compensated for to increase the ability of the thrust bearing to absorb surge forces. In this regard, at a minimum, the overload margins twenty-five percent of the thrust bearing capacities. As can be appreciated, even larger margins are desirable if possible, for example, fifty percent. Although the present invention is not limited to the use of oil-free bearings as the invention would in fact be advantageous even in the case of the use of oil free bearings, it has particular application to magnetic and aerodynamic bearings that have limited overload margins. This increase in the ability of the thrust bearing to adsorb such surge forces allows the use of such oil-free bearings in large-scale compressor applications and in applications where continued operation of the compressor is particularly critical.

The driver can be an electric motor and the compressor shaft can be a motor shaft protruding from the electric motor. In such case, the thrust bearing is part of the electric motor. Further, the thrust bearing can be a magnetic bearing.

The at least one compressor can comprise a first compressor and a second compressor connected at opposite ends of the motor shaft and in flow communication with each other such that least two successive compression stages are provided in the compression system. In such case, the force difference is produced by a difference between the eye side force and the back disk force of at least one of the first compressor and the second compressor. The at least one compressor can be an upstream compression stage of a plurality of compression stages of the compression system. In such case, the low pressure region is in flow communication with an outlet or an inlet of one other compressor of an upstream compression stage of the plurality of compression stages and is pressurized by a bleed stream from the one other compressor.

The present invention also provides an apparatus for inhibiting a thrust bearing capacity of a compression system from being exceeded during a surge event. In such apparatus a thrust bearing is biased with a biasing force acting in one of two opposite axial directions of a compressor shaft connected to the thrust bearing and to an impeller of at least one compressor having a back disk seal. The compression shaft is driven by a driver to drive the impeller through rotation of the compressor shaft and the compression system has at least one stage of compression provided by the at least one compressor. The thrust bearing has a first thrust bearing capacity and a second trust bearing capacity to absorb axial loads acting upon the thrust bearing in the two opposite axial directions of the compressor shaft, respectively. The thrust bearing is configured such that a first overload margin exists between the first thrust bearing capacity and a first surge force and a second overload margin exists between the second thrust bearing capacity and a second surge force. The first surge force and the second surge force act in the two opposite axial directions and created during the surge event. The back disk seal is sized in a radial direction of the compressor shaft such the biasing force is generated by a force difference during normal operation of the compression system. The biasing force is produced by a force difference between an impeller eye side force and a back disk force exerted on the impeller, opposite to the eye side force, by a high pressure outer annular region and a low pressure inner annular region separated by the back disk seal of the impeller. The force difference is transmitted from the impeller and through the compressor shaft to the thrust bearing and increases one of the first overload margin and the second overload margin such that the first overload margin and the second overload margin are no less than about twenty-five percent of the first thrust bearing capacity and the second thrust bearing capacity, respectively.

The driver can be an electric motor, the compressor shaft can be a motor shaft protruding from the electric motor and the thrust bearing can be part of the electric motor. Further, the thrust bearing can be one of a magnetic bearing.

The at least one compressor can comprise a first compressor and a second compressor connected at opposite ends of the motor shaft and in flow communication with each other such that least two successive compression stages are provided in the compression system. The force difference is produced by a difference between the eye side force and the back disk force of at least one of the first compressor and the second compressor. The at least one compressor can be a downstream compression stage of a plurality of compression stages of the compression system. The low pressure region is in flow communication with an outlet or an inlet of one other compressor of an upstream compression stage of the plurality of compression stages and is pressurized by a bleed stream from the one other compressor.

BRIEF DESCRIPTION OF THE DRAWINGS

While the specification concludes with claims particularly pointing out the subject matter that applicants regard as their invention, it is believed that invention will be better understood when taken in connection with the accompanying drawings in which:

DETAILED DESCRIPTION

Figure 1:
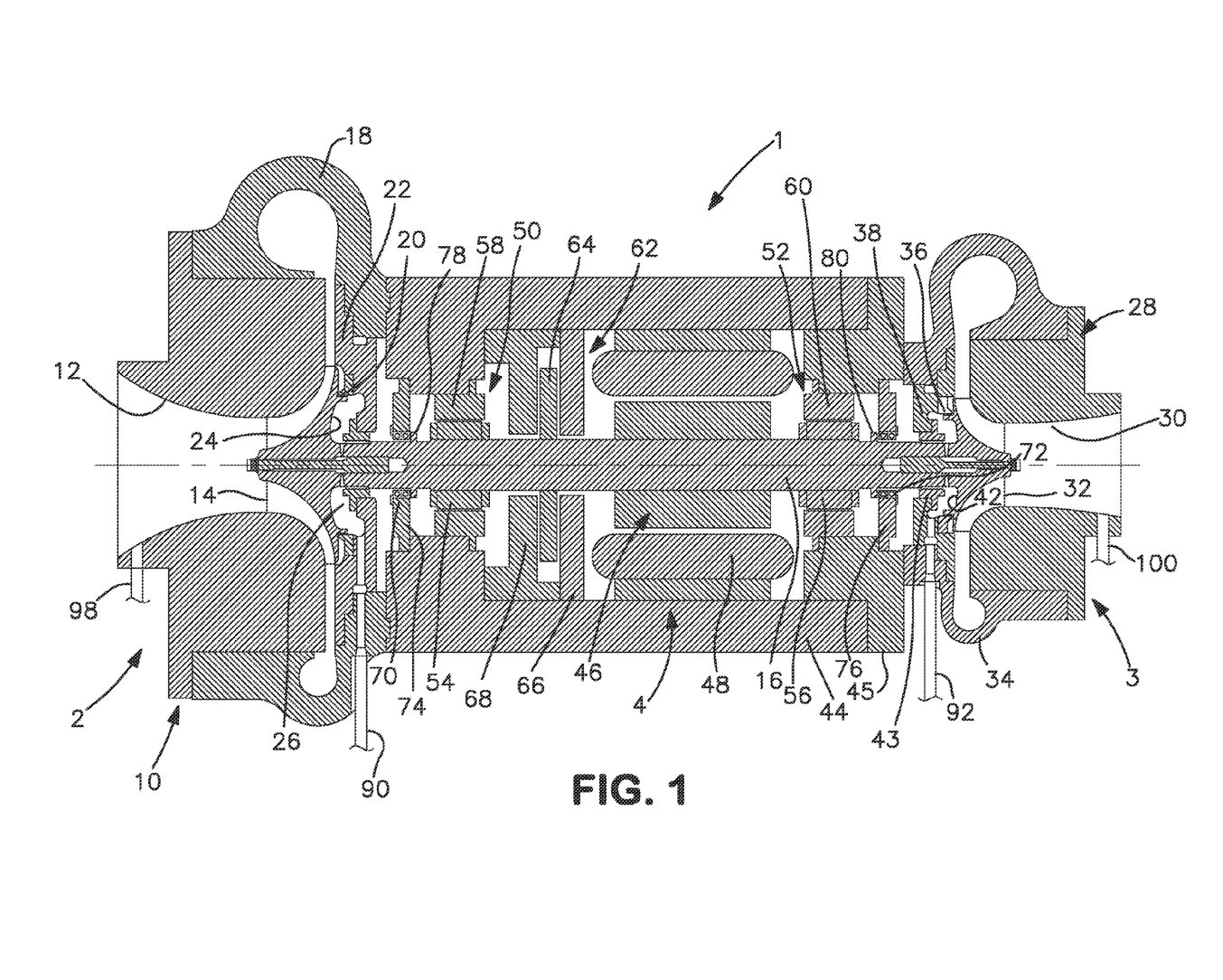
FIG. 1 is a schematic, sectional view of a compression system in accordance with the present invention that incorporates two compression stages.

With reference to FIG. 1, a compression system 1 is illustrated having two successive compression stages provided with two compressors 2 and 3, respectively, that are driven by an electric motor 4. Compressors 2 and 3 are centrifugal compressors. Compressor 2 compresses a gas, for instance air, from a low pressure to an intermediate pressure and compressor 3 further compresses the gas from the intermediate pressure to a yet higher pressure. Consequently compressor 3 has a higher outlet pressure than compressor 2. Although not illustrated, compressor 2 would be connected to compressor 3 by a suitable conduit and depending on the application of compression system 1 could incorporate interstage cooling. As will be discussed, however, the present invention has equal application to a compression system having a single compressor.

Compressor 2 includes a shroud 10 having an inlet 12 and an impeller 14 that is driven by a motor shaft 16 of the electric motor 4. The gas is driven by impeller 14 into a volute 18 from which the gas is expelled at a higher pressure than the gas entering compressor 2 from inlet 12. A back face seal 20 is provided to prevent the escape of high pressure gas from the back face of the impeller 14. As indicated above, the back face seal 20 is a labyrinth type of seal and circles the back of the impeller 14. A seal holder 22 retains the impeller back disk seal 20 in place. A cavity 24 is formed behind the impeller 14 that lies between the back disk seal 20 and the motor shaft 16. A shaft seal 26 that provides a seal about the motor shaft 16 thereby also sealing the cavity 24. Shaft seal 26 is also held in place by seal holder 22.

Compressor 3 is provided with a shroud 28 having an inlet 30 that is in flow communication with an outlet (not shown) of the volute 18 of the compressor 2 from which gas is discharged at an intermediate pressure. As indicated above, an interstage cooler could be provided between the outlet of the volute 18 and the inlet 30. An impeller 32 is driven by the motor shaft 16 of the electric motor 4 at the opposite end thereof to the end at which impeller 14 is driven. The gas is driven by impeller 32 into a volute 34 from the gas is expelled at a higher pressure than the gas entering compressor 3 from inlet 30. Although not illustrated, a conventional outlet in the volute 34 is provided for discharging the gas at such higher pressure. A back disk seal 36 is provided to prevent the escape of high pressure gas from the back face of the impellar 32. The back disk seal 36 is supported by a seal holder 38. A cavity 42 is formed behind the impeller 32 that lies between the back disk seal 36 and the motor shaft 16. A shaft seal 43 that provides a seal about the motor shaft 16 and therefore also seals cavity 42. Shaft seal 43 is held in place by a seal holder 38.

The shroud 10 is connected to the volute 18 which is in turn connected to one end of a cylindrical motor casing 44. The shroud 28 is connected to the volute 34 which is in turn connected to a motor cap 45. Motor cap 45 is connected to the opposite end of cylindrical casing 44. The electric motor 4 has a rotor 46 attached to motor shaft 16 and a stator 48 attached to the inside of cylindrical motor easing 44. The motor shaft 16 is supported at opposite ends by journal bearings 50 and 52. Journal bearings 50 and 52 are active magnetic bearings having conductors 54 and 56 attached to the motor shaft 16 and electromagnets 58 and 60 connected to the cylindrical motor casing 44 and the motor cap 45, respectively. The journal bearings 50 and electromagnetically suspend the motor Shaft 16 for rotational movement. An electromagnetic thrust bearing 62 is also provided. Thrust bearing 62 has a disk-like thrust runner 64 that is a conductor that rotates between inboard and outboard components 66 and 68, respectively, that are electromagnets that suspend the disk-like thrust runner 64 between the inboard and outboard components. Not illustrated, but as would be well known in the art, gap sensors are provided with associated electronics to differentially power the electromagnets to maintain the gaps between conductors 54 and 56 and the electromagnets 58 and 60 and the disk-like thrust runner 64 between its associated electromagnets of the outboard and inboard components 66 and 68. The ability to maintain the gaps by active magnetic bearings is not without force limit. This force limit can be exceeded during a surge event. Consequently, as a back up, two sets of bushings 70 and 72 are provided that are connected to the cylindrical motor casing 44 and the motor cap 45 by plates 74 and 76. During a power loss or upon startup or after a shutdown bushing 70 and 72 will radially support the motor shaft 16. End elements 78 and 80 connected to motor shaft 16 that are of ring-like configuration to contact the bushings 70 and 72 should the axial force on the motor shaft 16 exceed the capability of the thrust bearing 62. This can occur during a surge event and such axial forces imparted to motor shaft 16 through bushings 70 and 72 can be particularly severe. As such the number of surge cranes that the motor bushings 70 and 72 can be subjected to will be limited to a small number of events.

Figure 2:
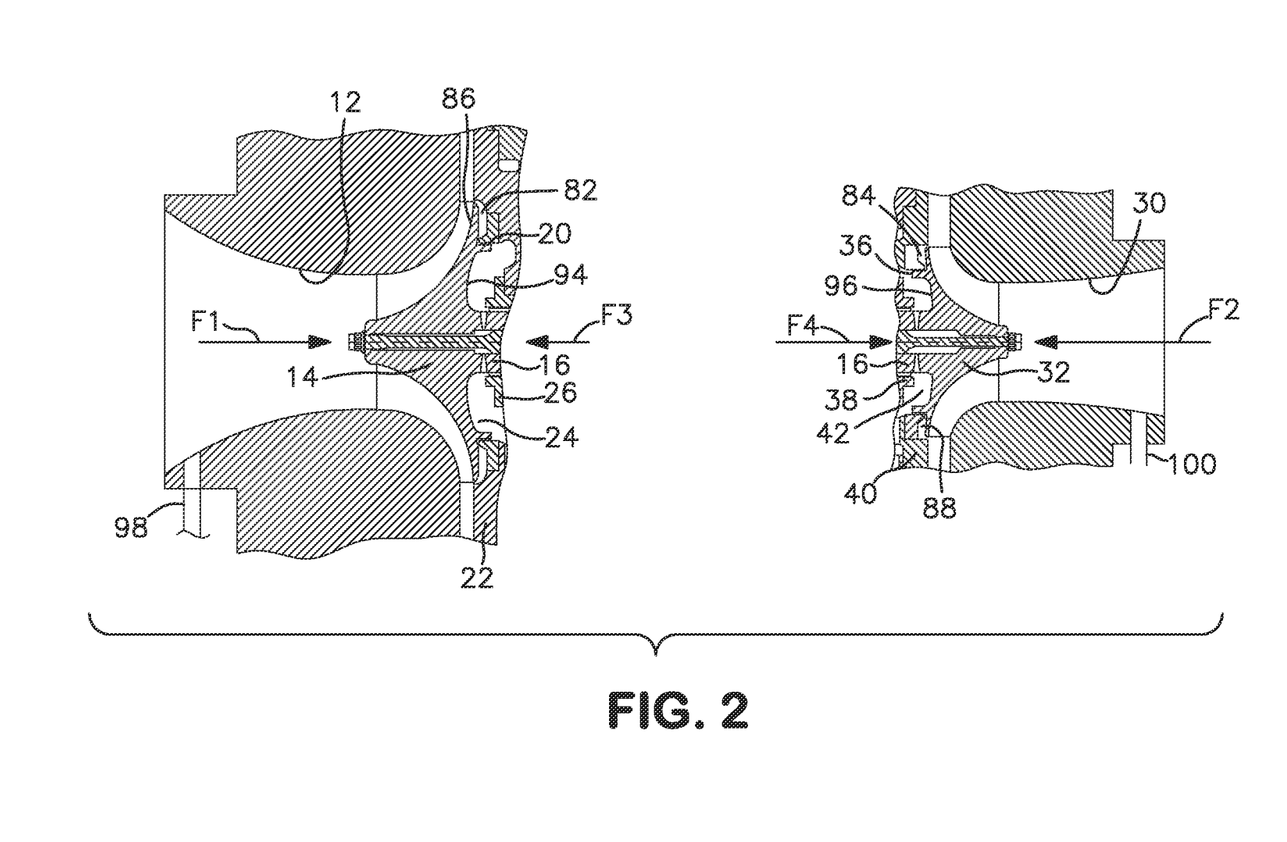
FIG. 2 is a schematic, fragmentary view of FIG. 1 that illustrates the eye side and back disk forces developed in each of the compression stages.

During operation of the compression system 1, the axial forces acting on the motor shaft 16 and therefore, the thrust bearing 62 are imparted as a result of a balance of axial forces on each of the impellers 14 and 32. With additional reference to FIG. 2, the impellers are subjected to an inwardly directed eye-side forces, shown as "F1" and "F2", respectively, that arise as a result of the gas passing through the inlets 12 and 30. Opposing these forces are back disk forces "F3" and "F4". These back disk forces arise from the high pressure gas produced by each of the impellers 14 and 32 escaping into the high pressure, outer annular, outer annular regions 82 and 84 that lie between the outer rims 86 and 88 of the impellers 14 and 32 and their associated back disk seals 20 and 36, respectively. Additionally, the cavities 24 and 42 are also pressurized by low pressure gas through back disk pipes 90 and 92 (shown in FIG. 1) and hence forces are exerted in the resulting low pressure, inner annular regions 94 and 96 of the impellers 12 and 32 that lie between the back disk seals 20 and 36 and the motor shaft 16, respectively. This low pressure gas can be obtained from the inlets 12 and 30 using connections 98 and 100, respectively. Alternatively, low pressure gas can be obtained from another source such as the inlet to any upstage compressor or in case of air compression, possibly the ambient.

Figure 3:
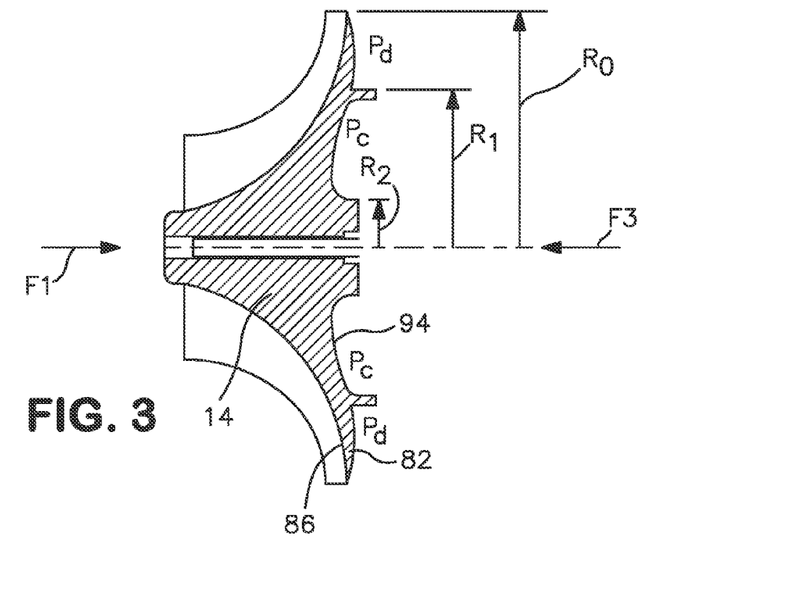
FIG. 3 is a schematic, fragmentary view of FIG. 1 illustrating the areas at which the eye side and back disk forces are developed on an impeller in the first stage of compression.

The foregoing can be better understood with reference to FIG. 3 in which the high pressure, outer annular region 82 and the low pressure, inner annular region 94 are shown with respect to the back disk force "F3". As can be appreciated, the back disk force "F3" is given by the equation:

$$F3 = \pi \ast [(R0^2 - R1^2) \ast P_d + (R1^2 - R2^2) \ast P_c];$$

Where the high pressure, outer annular region 82 is the area between R0 and R1, the high pressure gas is $P_d$ escaping from the outer rim 86 at R0 into such region and the low pressure, inner annular region 94 is the annular area between R1 and R2 and the low pressure gas in cavity 24 is $P_c$. "F1" is the eye side force equal to the summation of all pressures existing on the impeller eye side and is given by the equation:

F1 is determined by an integration of the pressure field across the inlet face of the impeller 14 by well known computer modeling techniques that can be carried out with the use of commercially available computer programs such as ANSYS CFX computational fluid dynamics software that can be obtained from Ansys, Inc. of Southpointe, 275 Technology Drive, Canonsburg, Pa. 15317, United States of America.

Figure 4:
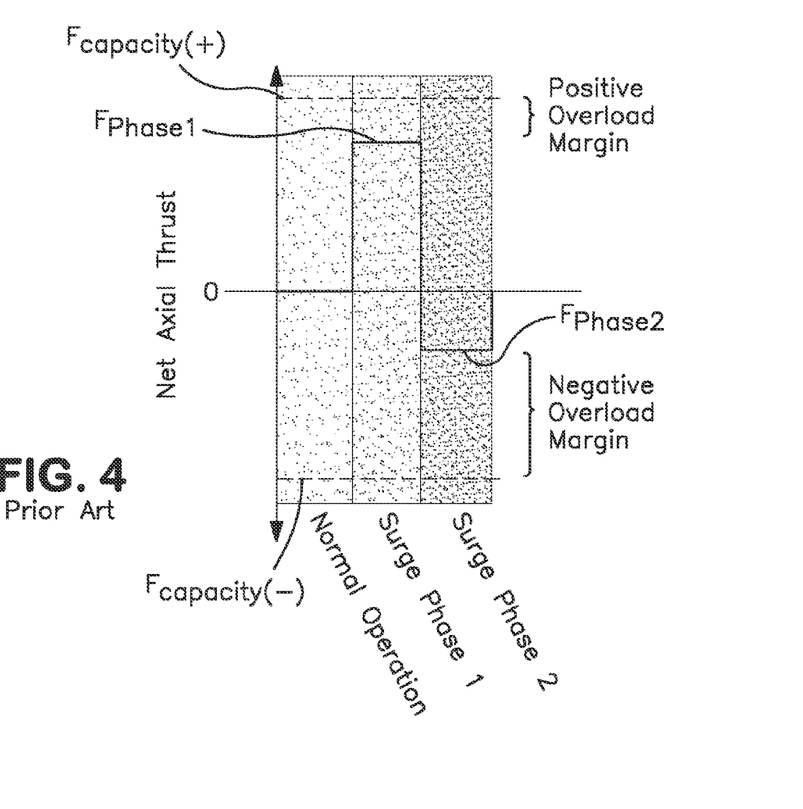
FIG. 4 is schematic diagram of the overload margins and the forces to which an impeller is subjected to in a compressor of the prior art.

With reference to FIG. 4, in the prior art as shown for the normal operation, in the case of impeller 14, the radii R1 defining the inner radius of the high pressure, outer annular region 82 (R0 and R1) and the outer radius of the low pressure, inner annular region 94 (R1 and R2) is set so that the net impeller thrust during normal operation is set to an acceptably low level or zero. In other words, if zero, F1–F3=0. The same approach would be used in the case of impeller 32 and consequently, the net impeller thrust during normal operation would also be set to acceptably low level or even zero. In other words, if zero, F2–F4=0. Since compressor 1 has two impellers 14 and 32, impeller back disk seals 20 and 36 with desired radii with respect to the impeller or the axis of the motor shaft are set such that the net thrust from both impellers during normal operating conditions is set to an acceptably low level or even zero. In other words, if zero, $F_1-F_3+F_4-F_2=0$. In a compressor with a single impeller, the net through for such impeller would be set to zero in the manner indicated above for each of the impellers 14 and 32.

With continued reference to FIG. 4, compressors are, however, subject to abnormal operating conditions and the thrust bearing must accommodate these safely. One such abnormal operating condition is surge which produces two alternating, asymmetric forces on the thrust bearing 62. The first phase (Surge Phase 1) is a sudden loss of discharge pressure arising from aerodynamic instability in the impeller. This results in a decrease in the eye side pressure. However, the back disk force, for instance F3 for impeller 14, remains high due to fluidic system inertial effects. This results in a large axial force towards the inlet, for instance inlet 12 with respect to impeller 14 which in such first phase acts in the same direction as force F3. The second phase (Surge Phase 2) occurs as the high pressure back disk pressure bleeds off, dramatically reducing the back disc force F3, while simultaneously the flow stabilizes and pressure rebuilds in the eye side and increases the eye side force F1. This results in a large axial force shown as Surge Phase 2 acting in the direction of F1. It is to be noted that during the surge event, both impellers 14 and 32 will be subjected to these oscillating forces because they are interconnected and in fluid communication. Hence, in FIG. 4 the solid lines shown during the surge events represent a summation of the forces acting on the thrust bearing 62 and eventually the bushings 70 and 72 when the forces exceed the thrust bearing capacity of the thrust bearing 62 to resist such forces. In FIG. 4, the dashed lines represent such thrust bearing capacity ($F_{capacity(+)}$ and $F_{capacity(-)}$), beyond which the bushings 70 and 72 will be contacted. The "Positive Overload Margin" and the "Negative Overload Margin" represent differences between such load capacities in positive and negative force directions and the maximum forces generated during the surge event in both positive and negative force directions, namely $F_{Phase\ 1}$ and $F_{Phase\ 2}$. The same considerations would apply to a compressor employing a single impeller, but without the summation of forces due to both impellers.

The purpose of the thrust bearing 62 is to prevent these alternating forces from damaging the compressor. When these thrust forces exceed the thrust bearing capacity, $F_{capacity(+)}$ and $F_{capacity(-)}$ of the thrust bearing 62, the end elements 78 and 80 connected to motor shaft 16 contact the back-up bushings 70 and 72 which are designed to protect the compressor during such event. However, such bushings have a limited life when contacted. As illustrated, the thrust bearings of the prior art can be designed with overload margins, positive and negative, that are designed to adsorb such alternating forces during surge events. However, in the case of oil-free bearings such as magnetic bearings, the load capacities are lower and these overload margins are not high and may not exist. Consequently, as discussed above, such bearings have found limited use. As could be appreciated by those skilled in the art, the same discussion would be equally applicable to air foil bearings which also have limited overload capacities.

It is to be noted that the axial forces during Surge Phase 1 and Surge Phase 2 can be obtained on an operating compression system by direct measurement or from indirect measurements and subsequent calculation, and or can be obtained during the design phase of a compression system from geometry and expected thermodynamic operating conditions. Direct measurement of axial force $F_{phase\ 1}$ and $F_{phase\ 2}$ on an operating compressor system using magnetic bearings is available by monitoring the magnetic thrust bearing control currents during surge and knowing the force-current coefficient. In-direct measurement and subsequent calculation of $F_{phase\ 1}$ and $F_{phase\ 2}$ on an operating compressor is performed by measuring thermodynamic conditions within the compression system and using known compressor geometry to compute $F_{phase\ 1}$ and $F_{phase\ 2}$ axial loading. During the design phase, detailed compressor aerodynamic designs provide expected thermodynamic conditions and actual geometry present that allow calculation of $F_{phase\ 1}$ and $F_{phase\ 2}$. The computation of $F_{phase\ 1}$ and $F_{phase\ 2}$ using geometry and either expected or measured thermodynamic conditions follow the same computational process used by those skilled in the art to calculate the impeller eye side forces F1 and F4 and back disk side forces F2 and F3.

Figure 5:
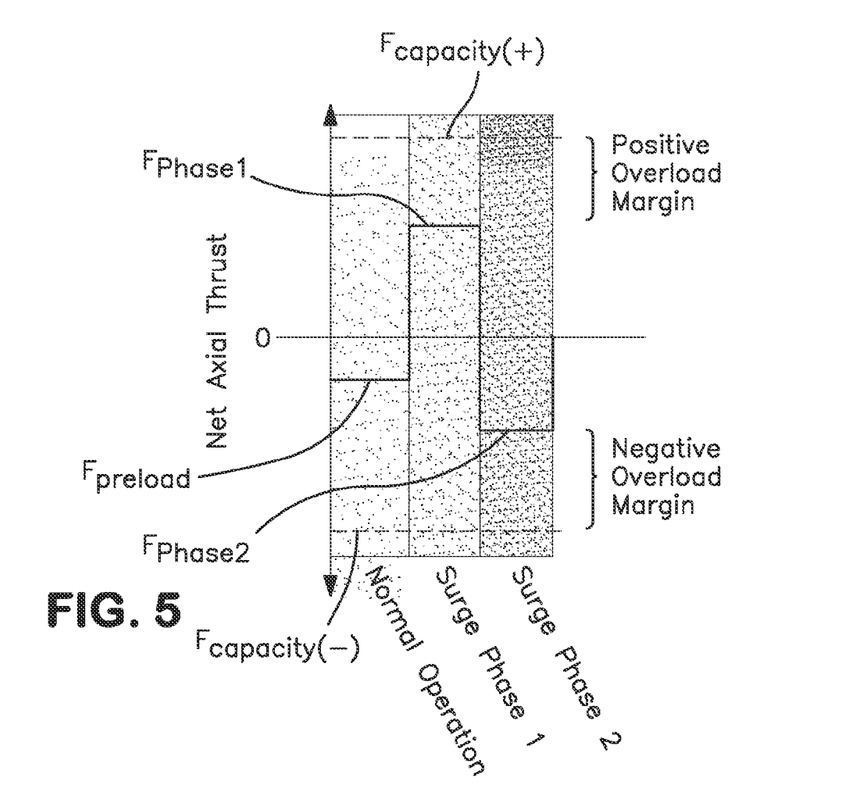
FIG. 5 is a schematic diagram of the of the overload margins and the forces to which an impeller is subjected to in a compressor of the present invention.

In accordance with the present invention, contrary to the prior art, the thrust bearing is preloaded by a force that will increase one of the overload margins at the expense of the other overload margin to in turn increase the ability of the thrust bearing to resist a surge event. With reference to FIG. 5, as an example, it is assumed that compressors 2 and 3 will experience a system surge such that the $F_{phase\ 1}$ will be greater than $F_{phase\ 2}$. In accordance with the present invention, to achieve a greater positive overload margin in Surge Phase 1 of the prior art shown in FIG. 4, the back disk seal radii for impellers 14 and/or 32 are adjusted to create a non-zero preload thrust value for the normal operation of compressor 1. As shown in FIG. 5, a preload force $F_{preload}$ at normal operating conditions will increase the positive overload margin in Surge Phase 1 of the surge event where such increase is required at the expense of decreasing the negative overload margin in Surge Phase 2 of the surge event. As can be appreciated without the preload, the system shown in FIG. 5 would have a dangerously small Positive Overload Margin without the preload force because the force generated in phase 1, $F_{phase\ 1}$ would otherwise be closer to the positive thrust bearing capacity $F_{capacity(+)}$. It is to be noted that had the Negative Overload Margin been less than the Positive Overload Margin, before providing a preload, then the preload force $F_{Preload}$, would have been exerted in the opposite direction or in other words, toward the positive or $F_{Capacity(+)}$. In any event, the preload force $F_{preload}$ should be sufficient that both the positive overload margin and the negative overload margin is no less than twenty-five percent of the positive and negative thrust bearing capacities $F_{capacity(+)}$ and $F_{capacity(-)}$. As can be appreciated, even higher overload margins are desirable and if possible 50 percent and greater. It is to be noted, however, as the overload margins are increased, it is also possible that the thrust bearing capacities must also be increased to accommodate the increased margins. In such case, the entire thrust bearing 62 must be made larger and there exists a limit on the diameter of the thrust runner 64 that will maintain structural integrity at high speeds.

One possible way to produce a preload force in the direction of F3 during normal operation is by decreasing radii $R_1$ on impeller 14, thus, increasing the high pressure outer annular region 82 of the back disk, while decreasing the inner annular low pressure region 94. The result is to create a larger value of $F_3$ which acts in the negative direction such that a preload force $F_{preload}$ will now be present in the negative direction at normal operation of the compressor 1 as per shown in FIG. 5. It is particularly preferred to adjust back seal diameter $R_1$ to achieve equal positive and negative overload margins if consequence of an overload are the same in either direction.

Figure 6:
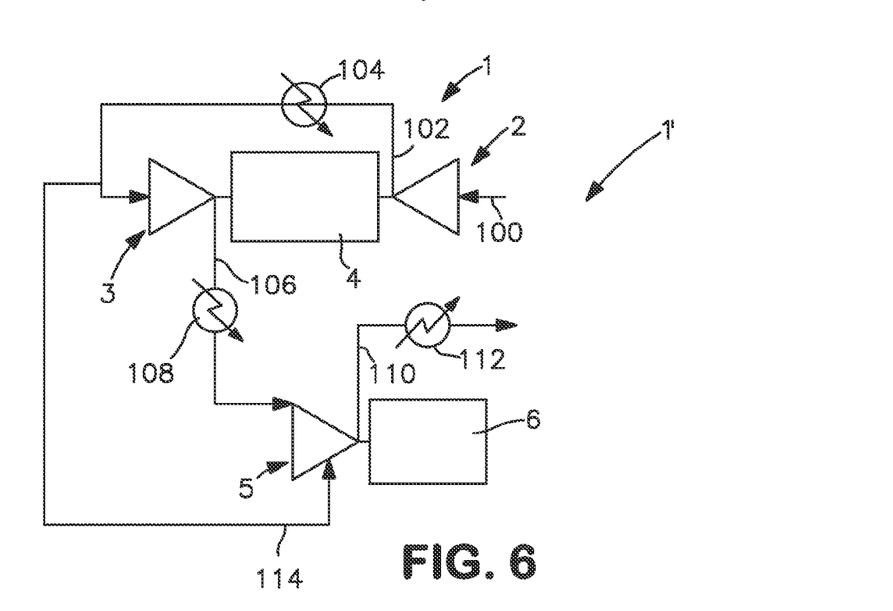
FIG. 6 is a schematic diagram of a compression system of the present invention in which an upstream compression stage is used to help provide the biasing force on the impeller in accordance with the present invention.

Although the foregoing preloading has been discussed with respect to manipulating the seal design with the appropriate sizing of $R_1$ for impellers of either or both compressors 1 and 2, the preload force can also be adjusted by the pressure acting on the low pressure, inner annular region by the use of a bleed a stream of low pressure gas from an upstream stage and apply it to the low pressure, inner annular region. With reference to FIG. 6, a multistage compression system 1' is illustrated having a compression system 1 as has been described above and having compressors 2 and 3. A feed stream 100 is compressed by compressor 2 to produce a compressed stream 102 at an intermediate pressure. Compressed stream 102 is cooled in an intercooler 104 and then further compressed in compressor 3 to produce a compressed stream 106. Compressed stream 106 is cooled in an intercooler 108 and then introduced into further compressor 5 for further compression. Compressor 5 is driven by an electric motor 6 of similar design to the electric motor 4 described above and such compressor 5 is also provided with seals of the type discussed with respect to compression system 1 and compressors 2 and 3. The resultant output compressed stream 110 can be cooled by an after-cooler 112. A bleed stream 114 of low pressure gas for the compression step 5 back disk cavity could be obtained from stream 102 as illustrated or stream 106. This low pressure bleed stream is fed into a back disk pipe associated with compressor 5 to pressurize its low pressure region behind the impeller to at least assist in the preloading of the compressor 5 in accordance with the present invention. Another benefit of selecting the lowest low pressure stream for the cavity 104 is that the back disk seal radii $R_1$ can be reduced and consequently less flow of gas will occur across this labyrinth seal. A reduction in seal flow will produce an increase in compression system efficiency. In other words, the smaller the radius of the back disk seal, the less seal area there is for high pressure gas to leak across.

It is to be noted that although the present invention has been discussed with respect to oil-free bearings such as electromagnetic and air foil bearings, the present invention could advantageously be applied to compression systems having conventional bearings lubricated by oil to provide an added margin of safety in case of a surge event. Furthermore, it is not only electrical driven compressors that are subject to surge events, but also, other types of compressors that are driven by other drive mechanisms, for instance, steam or expansion turbines and therefore the present invention in its most broad aspects is not limited to compressors driven by permanent magnet electric motors as illustrated in the Figures and that can be controlled by variable frequency drives. It is also to be noted, that although the present invention has been described with respect to compressors driven at opposite ends of a motor shaft, the present invention would have equal application to a compression system having a single stage of compression.

Additionally, a compression system with a single compressor at one end and an expansion turbine drive or stage at the other end would be a valid application of this invention. This arrangement, known in the industry as a turbocompressor or turbocharger, typically would not include an integral high speed motor. However, it is clear to one skilled in the art that this invention and this turbocompressor or turbocharger embodiment could also include an integral high speed motor, generator, or bidirectional motor/generator.

As will occur to those skilled in the art, although the present invention has been described with reference to preferred embodiments, numerous changes and omissions thereof can be made without departing from the spirit and scope of the present invention as set forth in the appended claims.

We claim:

1. A method of inhibiting a thrust bearing capacity of a compression system from being exceeded during a surge event, said method comprising:

biasing a thrust bearing with a biasing force acting in one of two opposite axial directions of a compressor shaft connected to the thrust bearing and to an impeller of at least one compressor having a back disk seal, the compressor shaft driven by a driver to drive the impeller through rotation of the compressor shaft, the compression system having at least one stage of compression provided by the at least one compressor;

the thrust bearing having a first thrust bearing capacity and a second thrust bearing capacity to absorb axial loads acting upon the thrust bearing in the two opposite axial directions of the compressor shaft, respectively, the thrust bearing configured such that a first overload margin exists between the first thrust bearing capacity and a first surge force and a second overload margin exists between the second thrust bearing capacity and a second surge force, the first surge force and the second surge force acting in the two opposite axial directions and created during the surge event and the surge event produced by flow rate through the at least one compressor falling below a minimum flow required at a given speed of the impeller of the at least one compressor that is necessary to maintain stable operation of the at least one compressor;

exerting the biasing force on the impeller and through the compressor shaft to the thrust bearing, during normal operation of the compression system, by producing a force difference between an impeller eye side force and a back disk force exerted on the impeller, opposite to the eye side force, by a high pressure outer annular region and a low pressure inner annular region separated by the back disk seal of the impeller; and the biasing force increasing one of the first overload margin and the second overload margin such that the other one of the first overload margin and the second overload margin that is not increased, is decreased and the first overload margin and the second overload margin are no less than about twenty-five percent of the first thrust bearing capacity and the second thrust bearing capacity, respectively.

2. The method of claim 1, wherein:

the driver is an electric motor, the compressor shaft is a motor shaft protruding from the electric motor, the thrust bearing is part of the electric motor and the thrust bearing is a magnetic bearing.

3. The method of claim 2, wherein:

the at least one compressor comprises a first compressor and a second compressor connected at opposite ends of the motor shaft and in flow communication with each other such that least two successive compressors are provided in the compression system; and the force difference is produced by a difference between the eye side force and the back disk force of at least one of the first compressor and the second compressor.

4. The method of claim 1 or claim 2, wherein:

the at least one compressor is a downstream compression stage of a plurality of compression stages of the compression system; and the low pressure region is in flow communication with an outlet or an inlet of one other compressor of an upstream compression stage of the plurality of compression stages and is pressurized by a bleed stream from the one other compressor.

5. An apparatus for inhibiting a thrust bearing capacity of a compression system from being exceeded during a surge event, said apparatus comprising:

a thrust bearing biased with a biasing force acting in one of two opposite axial directions of a compressor shaft connected to the thrust bearing and to an impeller of at least one compressor having a back disk seal, the compression shaft driven by a driver to drive the impeller through rotation of the compressor shaft, the compression system having at least one stage of compression provided by the at least one compressor;

the thrust bearing having a first thrust bearing capacity and a second thrust bearing capacity to absorb axial loads acting upon the thrust bearing in the two opposite axial directions of the compressor shaft, respectively, the thrust bearing configured such that a first overload margin exists between the first thrust bearing capacity and a first surge force and a second overload margin exists between the second thrust bearing capacity and a second surge force, the first surge force and the second surge force acting in the two opposite axial directions and created during the surge event and the surge event produced by flow rate through the at least one compressor falling below a minimum flow required at a given speed of the impeller of the at least one compressor that is necessary to maintain stable operation of the at least one compressor;

the back disk seal sized in a radial direction of the compressor shaft such that the biasing force is generated by a force difference during normal operation of the compression system, the biasing force produced by a force difference between an impeller eye side force and a back disk force exerted on the impeller opposite to the eye side force, by a high pressure outer annular region and a low pressure inner annular region separated by the back disk seal of the impeller; and the biasing force difference transmitted from the impeller and through the compressor shaft to the thrust bearing and increasing one of the first overload margin and the second overload margin such that the other one of the first overload margin and the second overload margin that is not increased, is decreased and the first overload margin and the second overload margin are no less than about twenty-five percent of the first thrust bearing capacity and the second thrust bearing capacity, respectively.

6. The apparatus of claim 5, wherein the driver is an electric motor, the compressor shaft is a motor shaft protruding from the electric motor and the thrust bearing is part of the electric motor and the thrust bearing is a magnetic bearing.

7. The apparatus of claim 6, wherein:

the at least one compressor comprises a first compressor and a second compressor connected at opposite ends of the motor shaft and in flow communication with each other such that least two successive compression stages are provided in the compression system; and the force difference is produced by a difference between the eye side force and the back disk force of at least one of the first compressor and the second compressor.

8. The apparatus of claim 5 or claim 6, wherein:

the at least one compressor is a downstream compression stage of a plurality of compression stages of the compression system; and the low pressure region is in flow communication with an outlet or an inlet of one other compressor of an upstream compression stage of the plurality of compression stages and is pressurized by a bleed stream from the one other compressor.

\* \* \* \* \*